United States Patent [19]

Cristian et al.

[11] Patent Number: 4,734,830

[45] Date of Patent: Mar. 29, 1988

[54] METHOD AND APPARATUS FOR ARTIFICIALLY ILLUMINATING VEGETATION

[75] Inventors: Michael R. Cristian, Arcata; Genaro R. Calabrese, Ferndale; Jaxon Hice, Santa Rosa, all of Calif.

[73] Assignee: Sun Circle, Inc., Ferndale, Calif.

[21] Appl. No.: 891,506

[22] Filed: Jul. 28, 1986

Related U.S. Application Data

[63] Continuation-in-part of Ser. No. 6,615,982, May 30, 1984, abandoned.

[51] Int. Cl.<sup>4</sup> .............................................. F21V 21/30
[52] U.S. Cl. ........................................ 362/35; 362/1; 362/384; 362/805; 47/DIG. 6
[58] Field of Search ................. 362/35, 122, 286, 384, 362/428, 805, 231, 1; 250/492.1, 494.1, 522.1; 47/DIG. 6

[56] References Cited

U.S. PATENT DOCUMENTS

| | | | |
|---|---|---|---|
| 2,802,094 | 8/1957 | Grosz | 362/35 |
| 2,984,738 | 5/1961 | Belau | 362/35 |
| 3,885,865 | 5/1975 | Stern et al. | 362/35 X |
| 4,163,342 | 8/1979 | Fogg et al. | 47/DIG. 6 X |
| 4,196,544 | 4/1980 | Davis et al. | 47/DIG. 6 X |
| 4,214,296 | 7/1980 | Magett | 362/35 |
| 4,441,145 | 4/1984 | Antkowiak | 362/805 X |

*Primary Examiner*—Margaret A. Focarino
*Attorney, Agent, or Firm*—Townsend and Townsend

[57] ABSTRACT

A rotating lamp fixture includes a plurality of lamps, attached to an arm which extends outwardly from a housing preferably mounted to the ceiling of a building. The arm is connected through a torque coupling and a gear train to the shaft of an electrical motor. The motor imparts a relatively slow circular or orbital motion to the lamps through the arm for serving as an artificial light source. The provision of a rotating light source reduces by at least one-third the number of fixed light sources needed for effectively controlling the growth of vegetation. The rotating lamp fixture increases the growth rate, improves the uniformity of growth, and/or precisely controls one or more other growth characteristics of the vegetation. Other features are also disclosed.

14 Claims, 2 Drawing Figures

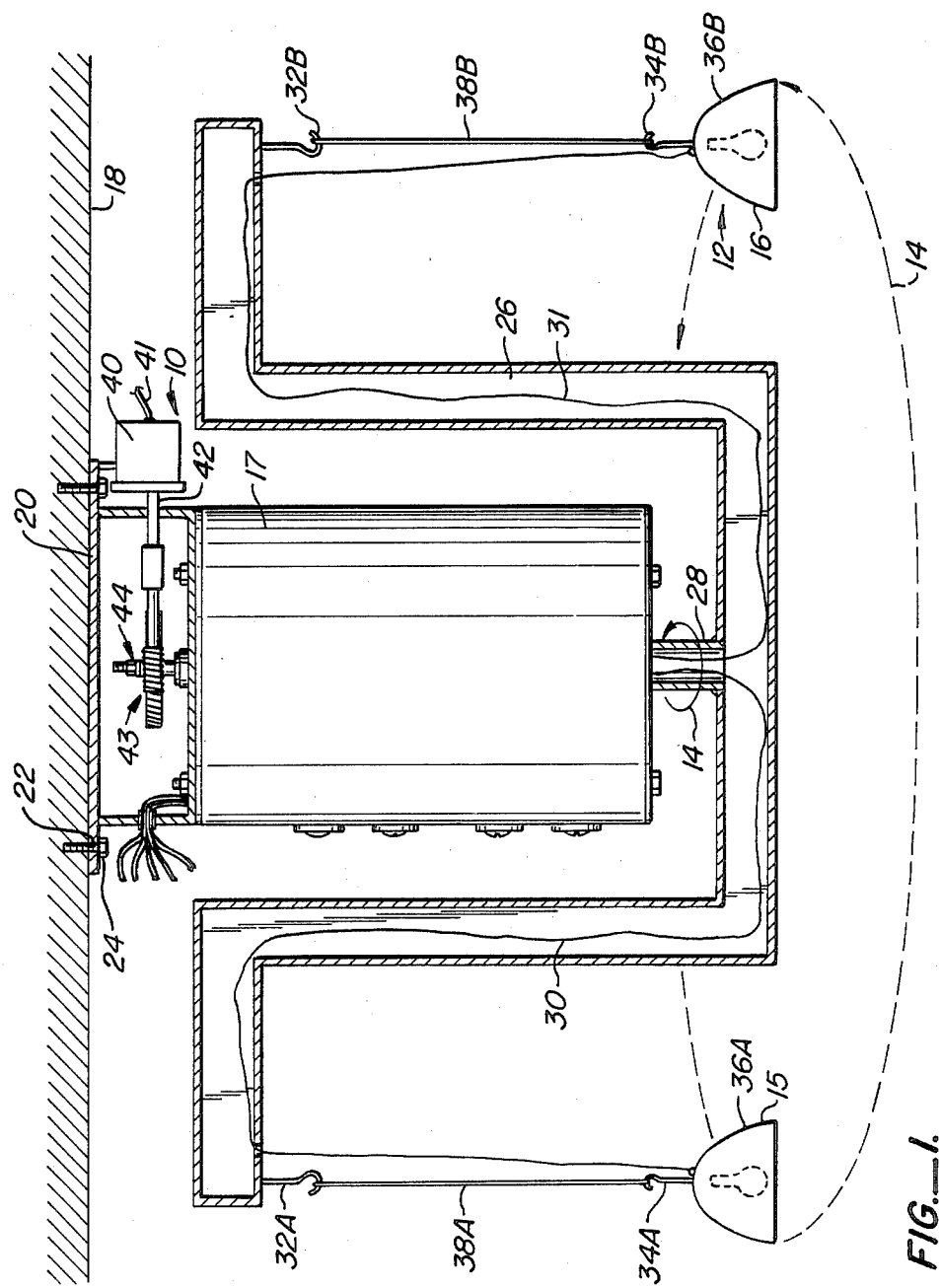
FIG._1.

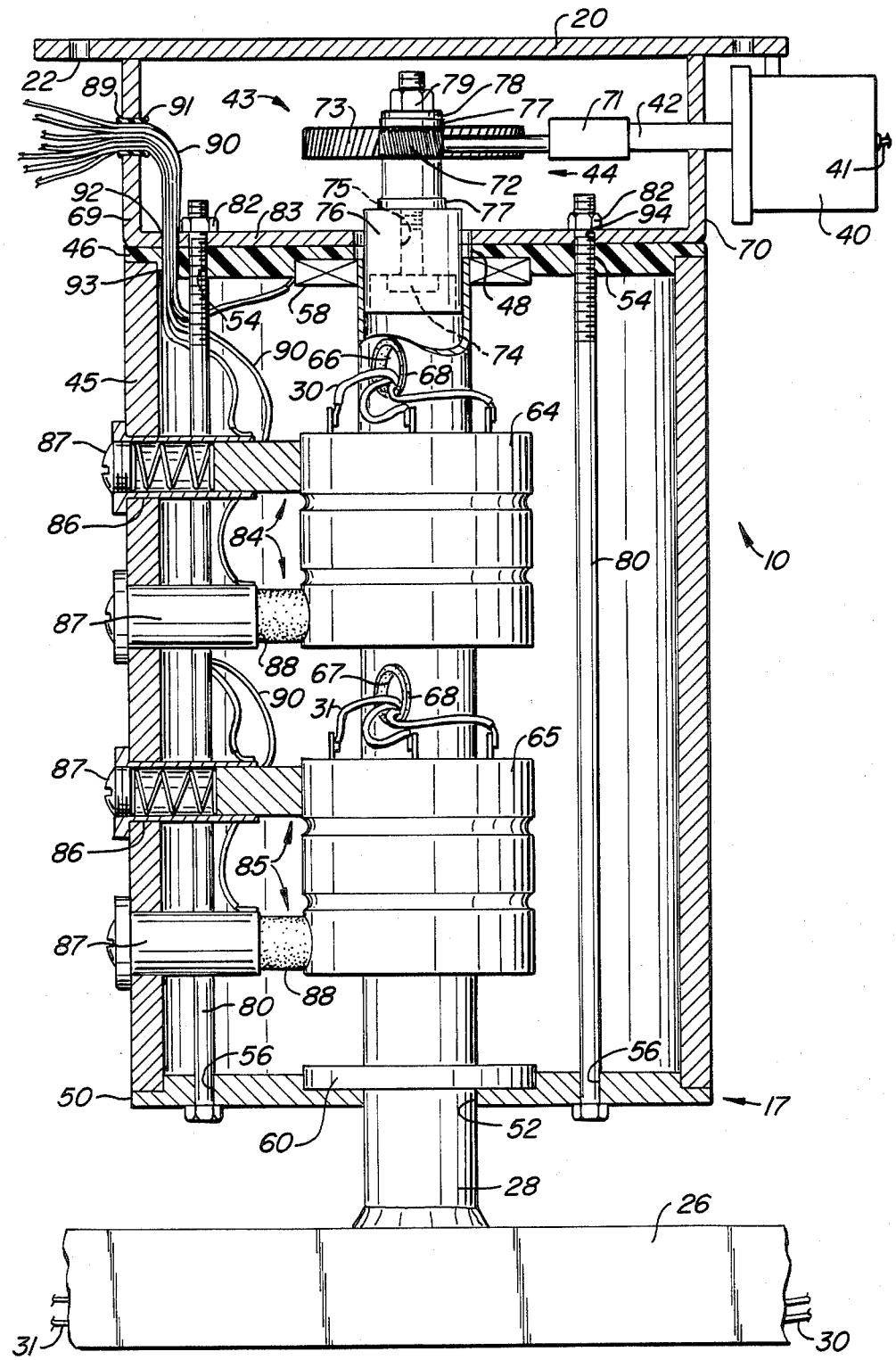
FIG._2.

METHOD AND APPARATUS FOR ARTIFICIALLY ILLUMINATING VEGETATION

CROSS-REFERENCE TO RELATED APPLICATION

This is a continuation-in-part of a patent application of Michael R. Christian, Genaro R. Calabrese, and Jaxon Hice, U.S. Ser. No. 06/615,982, filed on May 30, 1984, entitled "METHOD AND APPARATUS FOR ARTIFICIALLY ILLUMINATING VEGETATION," now abandoned.

BACKGROUND OF THE INVENTION

This invention relates to horticulture and, more particularly, to controlling the growth of vegetation, especially where there is an absence of natural light or the amount of natural light is insufficient to produce an acceptable growth rate or other desired growth characteristic of the vegetation. Specifically, the invention is directed to a method and apparatus for supplying artificial light in circumstances where there is a dearth of natural light so that an increased amount of vegetation can be grown efficiently, vegetation having more uniform foliage can be produced, and/or other selected growth characteristics, such as flower or fruit bearing, can be precisely controlled.

Most vegetation is grown with natural light, that is, sunlight. A majority of plants grown by sunlight is raised outdoors. However, greenhouses and hothouses can employ sunlight for growing vegetation indoors, especially in geographical regions remote from the equator where temperatures, as well as the insufficiency of light, can affect plant growth. Greenhouses and hothouses afford protection from freezing temperatures and frost so that plants can be grown even if the rate of growth is slow because of the small amount of sunlight. However, the deficiency of sunlight can be remedied by using artificial light in addition to sunlight for stimulating the growth of vegetation. Furthermore, even when sunlight is adequate for producing growth during certain seasons of the year, artificial light can be employed during the nighttime for enhancing growth.

Greenhouses and hothouses are not generally cost effective in extremely cold climates since they cannot typically be well insulated and at the same time admit a sufficient quantity of sunlight. Therefore, a cost effective alternative is to provide an insulated building and use exclusively artificial light for growing plants.

Additionally, vegetation which has uniform or symmetrical foliage is more healthy and, in the case of decorative plants, more salable. However, uniform foliage is not easily produced with known artificial light systems.

Furthermore, other growth characteristics of vegetation can be controlled by artificial light. These other growth characteristics include, for example, producing blooms, causing fruit to be produced, or, alternatively, stimulating the growth of foliage instead of flowers or fruit, dependent upon the nature of the vegetation being grown. Known artificial light systems often do not provide precise control of these other growth characteristics.

The use of artificial light for growing vegetation, as well as stimulating the growth of plants, and/or controlling other growth characteristics of vegetation, has increased over the years for various reasons, for example, the demand for fresh fruits and vegetables during times of the year other than the traditional growing season, the popularity of decorative tropical plants, growing plants as a hobby, propagating exotic flowers, etc. This has produced various advances in the field of artificially illuminating vegetation.

Notable among these advances are the strides made in lamp elements which serve as the source of the artificial light used for controlling the growth of plants. Metal halide, mercury vapor, and tungsten halogen grow lamps have been developed, which provide a spectrum of intense light for controlling the growth of vegetation. These grow lamps, however, are quite expensive and cost on the order of several hundred dollars a lamp fixture. In order to provide sufficient artificial light on a large or commercial scale, many such grow lamps are needed, which translates to a substantial investment in lamp fixtures. Furthermore, the operating expenses and grow lamp replacement cost can also be significant. Heretofore, there have been significant economic disadvantages to the use of these and other types of grow lamps for controlling the growth of vegetation.

Additionally, Antkowiak, U.S. Pat. No. 4,441,145, discloses a lighting system for growing plants indoors. The lighting system disclosed in this patent comprises an elongated frame forming a track, a conveyor chain trained around a drive sprocket and an idler sprocket mounted at the respective ends of the track, an electric motor connected to the drive sprocket, a carriage or carrier assembly fixed to the chain, and a lamp support chain fixed at one end to the carrier assembly and at the other end to a grow lamp. The grow lamp reciprocates along the track in a cyclic manner over the plants, thereby simulating the natural conditions of solar lighting as experienced by plants growing outdoors.

Unfortunately, the lighting system disclosed in Antkowiak, U.S. Pat. No. 4,441,145, produces nonuniform illumination of the plants as the grow lamp moves along the track, since, for example, plants at each end of the track are subjected to intense light over a single, relatively long interval, while plants below the center of the track are intensely illuminated at two separate, relatively short intervals during cyclic movement of the lamp. Also, this lighting system accommodates only a single grow lamp having a limited light spectrum, since the disposition of an additional grow lamp having a different light spectrum for producing a selected growth characteristic of the plants would result in a collision of the lamps during cyclic movement along the track.

SUMMARY OF THE INVENTION

In accordance with the invention, a method and apparatus for artificially illuminating vegetation are provided for substantially reducing the number of grow lamps needed for efficiently controlling the growth of vegetation. In accordance with the invention, a moving source of artificial light is provided for impinging artificial light on a greater area of vegetation than that illuminated by a stationary artificial light source or a light source reciprocated along a track. At the same time, the moving source of artificial light in accordance with the invention provides more uniform illumination of vegetation and an extended light spectrum so as to optimize control over the growth of the vegetation.

In accordance with the method aspect of the invention, a method is provided for artificially illuminating vegetation. The method comprises the steps of: providing a source of artificial light including a plurality of grow lamps, the artificial light having a spectrum and intensity for controlling a preselected growth characteristic of vegetation when the artificial light is impinged on the vegetation; and imparting low-frequency non-linear cyclic movement to the source of artificial light so that the uniformity of illumination over the area of vegetation on which the artificial light is impinged is increased.

In accordance with the apparatus aspect of the invention, an embodiment of apparatus is provided for artificially illuminating vegetation. The apparatus comprises: a source of artificial light including a plurality of grow lamps, the artificial light having a spectrum and intensity for controlling a preselected growth characteristic of vegetation when the artificial light is impinged on the vegetation; and means for imparting low-frequency non-linear cyclic movement to the source of artificial light so that the uniformity of illumination over the area of vegetation on which the artificial light is impinged is increased.

The provision of a moving source of artificial light in accordance with one embodiment of the invention reduces by at least one-third the number of fixed light sources needed for controlling the growth of vegetation. Furthermore, the vegetation grown in accordance with the method and apparatus of the invention has more uniform and symmetrical foliage than can be produced with a fixed pattern of grow lamps or a single grow lamp reciprocated along a track. Also, desired growth characteristics can be more precisely controlled.

BRIEF DESCRIPTION OF THE DRAWINGS

The above and other features of the invention and the concomitant advantages will be better understood and appreciated by those skilled in the art in view of the description of the preferred embodiments given below in conjunction with the accompanying drawings. In the drawings:

FIG. 1 is a plan view of a lamp fixture in accordance with one embodiment of the invention; and FIG. 2 is a partial cutaway view of a portion of the lamp fixture shown in FIG. 1.

DESCRIPTION OF THE PREFERRED EMBODIMENTS

Referring to the drawings, FIG. 1 shows an embodiment of apparatus in accordance with the invention for artificially illuminating vegetation, the apparatus being generally designated by the numeral 10. The apparatus 10 moves a source of artificial light 12 over a path such that the area illuminated while the artificial light source is moved along the path is greater than the area illuminated if the source of artificial light were stationary. Preferably, the path is a circular path 14. Each of the rotations of the source of artificial light 12 along the circular path 14 produces uniform illumination of the area circumscribed by the circle.

Preferably, the source of artificial light 12 includes a plurality of grow lamps, such as a grow lamp 15, for example, a metal halide grow lamp, and a grow lamp 16, for example, a high pressure sodium grow lamp. The light spectrum of the grow lamp 15 and the light spectrum of the grow lamp 16 are preferably different such that the light spectra combine to produce a light spectrum for effectively controlling one or more desired growth characteristics of the vegetation. For example, the apparatus 10 can rotate a grow lamp 15 in the form of a metal halide grow lamp and a grow lamp 16 in the form of a high pressure sodium grow lamp. This combination produces a blend of light which simulates fall sunlight that promotes vigorous floral growth. Alternatively, the apparatus 10 can rotate a grow lamp 15 in the form of a clear metal halide grow lamp for brilliance and a grow lamp 16 in the form of a phosphor coated metal halide grow lamp for diffusion. This combination achieves a broad light spectrum which simulates summer sunlight that stimulates high-level photosynthesis in growing plants and promotes rapid growth of foliage.

As shown in FIG. 1, the apparatus 10 includes a housing 17 mounted to the ceiling 18 of a building, such as a greenhouse or hothouse ceiling, for example. Preferably, a mounting plate 20 is attached to the housing 17. The flanges of the plate 20 are provided with holes 22. Fasteners 24, such as screws, can be extended through the holes 22 in the flanges of the plate 20 and fastened to the ceiling 18 for securing the apparatus 10 to the ceiling.

The grow lamps 15 and 16 are supported by an arm 26 mounted to a tubular driven coupling 28. The tubular coupling 28 is rotatable. The arm 26 is preferably a box beam which provides a conduit for wires 30 and 31 through which electrical power is supplied to the grow lamps 15 and 16, respectively.

Preferably, a first hook 32A is secured to the arm 26, and a second hook 34A is provided on the reflector 36A of the grow lamp 15. A chain 38A having an adjustable length interconnects the hooks 32A and 34A for suspending the grow lamp 15 from the arm 26 at a selected height above the vegetation. The grow lamp 16 is similarly suspended from the arm 26.

The apparatus 10 further includes an electrical gear motor 40 energized by a supply of electrical power (not shown) through wires 41. The gear motor 40 has a drive shaft 42. The gear motor 40, for example, can be a 115-volt, 60-hertz, five-watt, one-revolution-per-minute shaded pole gear motor manufactured by Merykl Korf located in Des Plaines, Ill. The gear motor 40 is synchronous with the frequency of the electrical power supply, which provides precise control of the movement of the grow lamps 15 and 16.

The drive shaft 42 is preferably interconnected to the tubular coupling 28 by means of a gear train 43 and a torque coupling 44. The gear motor 40 drives the drive shaft 42, gear train 43, torque coupling 44, tubular coupling 28, and arm 26 so that a circular or orbital motion is imparted to the grow lamps 15 and 16.

The apparatus 10 can be easily adapted for moving more than two grow lamps 15 and 16 suspended from another section of the arm 26 at a selected height above the vegetation. Alternatively, the apparatus 10 can include an additional arm(s) (not shown) from which the additional grow lamps are suspended. For example, the apparatus 10 can preferably accommodate as many as six grow lamps. Consequently, a plurality of grow lamps having various spectral characteristics can be included in the apparatus 10 for providing full-spectrum artificial illumination.

Referring now to FIG. 2, a partial cutaway view of a portion of the apparatus 10 is shown. The housing 17 includes a cylindrical dielectric shell 45. The housing 17 further includes a first or top disc-shaped end plate 46 having a bore 48. The housing 17 also includes a second or bottom disc-shaped end plate 50 having a bore 52. The end plate 46 is also provided with holes 54, and the end plate 50 is provided with holes 56. The end plates 46 and 50 are adapted so that the bores 48 and 52 align and the holes 54 can be aligned with the holes 56 when the end plates are engaged in the opposite ends of the dielectric shell 45 as will be described in more detail later.

The bore 48 in the end plate 46 accommodates a bearing 58, for example, a ball bearing, which is press-fitted into the bore 48. Similarly, the bore 52 in the end plate 50 accommodates a bearing 60, also a ball bearing, for example, which is press-fitted into the bore 52.

The tubular coupling 28 is journaled in the bearings 58 and 60. The tubular coupling 28 is provided with a plurality of slip ring means 64 and 65 which can be press-fitted circumferentially onto the coupling. Each of the slip ring means 64 and 65, for example, can be a Part No. C-29G slip ring assembly manufactured by Kirkwood Products Company of Cleveland, Ohio.

The plurality of slip ring means 64 and 65 is provided for the purpose of accommodating a plurality of grow lamps, such as the grow lamps 15 and 16, which have different power requirements and therefore require separate circuits. The use of the four slip rings included in the slip ring means 64 and 65 shown in FIG. 2 allows two individual circuits to be employed so that a plurality of grow lamps, which can be of different voltages or different frequencies, can be rotated together over the same area. For example, the spectrum of light produced by a metal halide grow lamp lies in the blue-to-yellow range. The light spectrum produced by a high pressure sodium grow lamp falls in the yellow-to-red range. These grow lamps combine to supply a broad spectrum of light, which is conducive to promoting the growth of flowers. However, due to the nature of the high pressure sodium grow lamp arc tube, a 3000- to 5000-volt spike is needed to ignite the metal gas, whereas the metal halide grow lamp cannot withstand such high voltages. Therefore, the provision of two individual circuits is needed to allow these two grow lamps to be rotated over the same area. The provision of two independent circuits also permits these grow lamps to be turned off and on independently of one another for controlling a particular growth characteristic of the vegetation being grown and/or for conserving energy.

The tubular coupling 28 is also provided with a plurality of holes 66 and 67 through which the wires 30 and 31 are routed for connection to the slip rings included in the slip ring means 64 and 65, respectively. A rubber or plastic grommet 68 can be inserted in each of the holes 66 and 67 for insulating and constraining the wires 30 and 31, respectively.

The plate 20 preferably comprises the rear wall of an electrical junction box 69. The gear motor 40 is mounted to a sidewall 70 of the junction box 69. The drive shaft 42 extends through the sidewall 70 and is interconnected by a sleeve 71 to the gear train 43, which is in turn interconnected by the torque coupling 44 to the tubular coupling 28.

The gear train 43 comprises a worm gear 72 interconnected by the sleeve 71 to the drive shaft 42. The gear train 43 also comprises a rotary gear 73 which meshes with the worm gear 72. The gear train 43 preferably provides a 60:1 speed reduction, which converts the rotation of the arm 26 connected to the tubular coupling 28 to a rate of one rotation an hour. The gear train 43, however, can be configured to produce a speed other than one rotation per hour if a different speed is desired, for example, to control a preselected growth characteristic of the vegetation. Nevertheless, a speed slower than one rotation every forty minutes is generally preferred.

The tubular coupling 28 is coupled to the gear train 43 at the end of the coupling journaled in the bearing 58. Preferably, the torque coupling 44 is included for coupling the gear train 43 to the tubular coupling 28.

The torque coupling 44, which interconnects the gear train 43 and the tubular coupling 28, includes a bolt 74 disposed in a bore 75 in a mild steel plug 76. The plug 76 is press-fitted into the tubular coupling 28 so that the threaded end of the bolt 74 extends beyond the end of the coupling. A Telfon (registered trademark) washer 77 is preferably slipped onto the threaded end of the bolt 74. The rotary gear 73 is then placed on the threaded end of the bolt 74. Another Teflon washer 77 is next preferably slipped onto the threaded end of the bolt 74. Thereafter, a Bellville washer 78 is stacked onto the threaded end of the bolt 74. Finally, a jam nut 79 is rotated onto the threaded end of the bolt 74 and tightened with a torque wrench for the purpose of providing a yieldable interconnection between the gear train 43 and the tubular coupling 28, which slips if the arm 26 is blocked. This provides safety, as well as prevents burn-out of the gear motor 40 and therefore provides a protective mechanism for the apparatus 10. The tubular coupling 28 is rigidly attached to the arm 26, for example, the end of the coupling journaled in the bearing 60 can be welded onto the arm.

As shown in FIG. 2, the holes 54 in the end plate 46 are aligned with the holes 56 in the end plate 50. Bolts 80 are inserted through the holes 54 in the end plate 46 and the holes 56 in the end plate 50, and nuts 82 are fastened onto the threaded ends of the bolts. Preferably, the bolts 80 also extend through aligned holes 94 in a front wall 83 of the junction box 69, and the nuts 82 fasten the housing 17 to the junction box.

A plurality of brush means 84 and 85 is secured in positions juxtaposed with the slip ring means 64 and 65, respectively. Preferably, the dielectric shell 45 is provided with holes 86 as shown in FIG. 2. The brush means 84 and 85 preferably comprise brush holders 87 press-fitted into the holes 86. Each of the brush holders 87 can be a Series H62 molded plastic brush holder manufactured by the Thermotech Division of ITT located in Hopkins, Minn. Each of brush holders 87 is provided with a brush 88. Each of the brushes 88 can be 3×5 (0.188×0.313 inch) 150 amperes/square inch copper impregnated graphite dual brush also manufactured by the Thermotech Division of ITT.

In one modification, the brush means 84 and 85 need not be mounted to the dielectric shell 45. The brush means 84 and 85 can comprise the brush holders 87 mounted on a bracket (not shown) of a dielectric material, such as Micarta, secured to one of the end plates 46 or 50, together with the brushes 88.

In another modification, insulative tubes (not shown) can be aligned with the holes 54 in the end plate 46 and the holes 56 in the end plate 50. The insulative tubes are preferably a dielectric material, such as phenoxy tube. The bolts 80 are inserted through the holes 54 in the end plate 46, the insulative tubes, and the holes 56 in the end plate 50, and the nuts 82 are fastened onto the threaded ends of the bolts. The brush means 84 and 85 are secured to a selected one of the insulative tubes in positions juxtaposed with the slip ring means 64 and 65. The brush means 84 and 85, for example, can include a Part No. BRH-102 brush holder manufactured by Kirkwood Products, which is secured to one of the insulative tubes by means of set screws. The brushes can be Part No. PX-487C, Grade BQ brushes manufactured by Kirkwood Products.

As shown in FIG. 2, an additional hole 89 is preferably provided in the junction box 69. Wires 90 from the electrical outputs of appropriate ballasts (not shown) are passed through the hole 89. A rubber or plastic grommet 91 can be inserted in the hole 89 for insulating and constraining the wires 90.

The wires 90 are routed through a hole 92 in the front wall 83 of the junction box 69 and an aligned hole 93 in the end plate 46. The wires 90 are connected to the brush means 84 and 85.

In operation, electrical power is supplied by the ballasts through the wires 90, the brush means 84 and 85, the slip ring means 64 and 65, and the wires 30 and 31 to the grow lamps 15 and 16 shown in FIG. 1. The brush means 84 and 85 and the associated slip ring means 64 and 65 enable electrical power to be conducted to the grow lamps 15 and 16 while the gear motor 40 drives the grow lamps in the circular path 14 without the wires 90 or 30 and 31 being knotted or broken.

The provision of a moving source of artificial light in accordance with the invention reduces by at least one-third the number of fixed light sources needed for effectively controlling the growth of vegetation. Furthermore, the moving artificial light source in accordance with the invention improves the uniformity of growth vis-a-vis the growth produced by fixed light sources or a single light source reciprocated along a track. The moving source of artificial light in accordance with one embodiment of the invention moves slowly (on the order of one revolution per hour), which reduces wear and therefore increases the life of elements, especially grow lamps, and possesses heavy duty loading capabilities (on the order of 300 pounds bearing thrust). Also, the moving artificial light source in accordance with the invention enables precise control of the growing environment and provides safe operation.

While various embodiments for a moving lamp fixture have been described in order to make the invention understandable to those skilled in the art, it will be appreciated that variations and modifications not mentioned will become apparent to those skilled in the art. Furthermore, although a method is provided in accordance with the invention for artificially illuminating vegetation, other uses of the apparatus in accordance with the invention are contemplated. The apparatus in accordance with the invention, for example, can be employed for drying photographic prints. It is therefore to be clearly understood that the above description is by way of illustration and example only and is not to be taken by way of limitation. Accordingly, the spirit and scope of this invention are better ascertained by reference to the appended claims.

What is claimed is:

1. Apparatus for artificially illuminating vegetation, comprising:
   a source of artificial light including a plurality of grow lamps, at least two of the plurality of grow lamps having different power requirements, the artificial light having a spectrum and intensity for controlling a preselected growth characteristic of the vegetation when the artificial light is impinged on the vegetation; and
   means for imparting low-frequency non-linear cyclic movement to the source of artificial light, said imparting means composed of:
   a housing;
   means for mounting the housing to a ceiling;
   a motor mounted on the housing, the motor having a drive shaft;
   an arm extending outwardly from the housing;
   coupling means for coupling the drive shaft to the arm;
   a plurality of means for suspending the plurality of grow lamps from the arm;
   slip ring means associated with the coupling means;
   brush means associated with the housing, the brush means having brushes in positions juxtaposed with the slip ring means;
   first electrical conductor means for conducting electrical power to the brushes; and
   second electrical conductor means for conducting electrical power from the slip ring means to the plurality of grow lamps.

2. Apparatus as in claim 1 wherein the electrical power conducted to the respective brushes has different voltage characteristics.

3. Apparatus as in claim 1 wherein the housing comprises:
   a cylindrical dielectric shell;
   a first end plate having a bore and a plurality of holes;
   a second end plate having a bore and a plurality of holes;
   a plurality of threaded bolts associated with the plurality of holes in the first and second end plates; and
   a plurality of nuts fastened onto the bolts.

4. Apparatus as in claim 1 wherein the motor is an electrically powered gear motor.

5. Apparatus as in claim 1 wherein the motor is an electrically powered gear motor and the coupling means comprises a gear train, a torque coupling, and a tubular coupling for connecting the drive shaft to the arm.

6. Apparatus as in claim 5 wherein the gear train includes a rotary gear and the torque coupling comprises:
   a mild steel plug press-fitted into the tubular coupling, the plug having a bore;
   a threaded bolt disposed in the bore of the plug, the rotary gear being situated on the bolt;
   a Bellville washer disposed on an opposite side of the rotary gear from the plug; and
   a jam nut rotated onto the bolt into contact with the Bellville washer.

7. Apparatus as in claim 3 wherein the coupling means comprises:
   a gear train having a worm gear connected to the drive shaft and having a rotary gear meshed with the worm gear;
   a first bearing mounted in the bore of the first end plate;
   a second bearing mounted in the bore of the second end plate;
   a tubular coupling rotatably mounted in the first and second bearings;
   a mild steel plug press-fitted into the tubular coupling, the plug having a bore;
   a threaded bolt disposed in the bore of the plug, the rotary gear being situated on the bolt;
   a Bellville washer disposed on an opposite side of the rotary gear from the plug; and
   a jam nut rotated onto the bolt into contact with the Bellville washer.

8. Apparatus as in claim 1 wherein each of the means for suspending a grow lamp from the arm comprises
a first hook attached to the grow lamp;
a second hook attached to the arm; and
a chain for interconnecting the first and second hooks.

9. Apparatus as in claim 1 wherein the arm comprises a box beam.

10. Apparatus as in claim 1 wherein the coupling means includes a tubular coupling and the slip ring means is press-fitted circumferentially onto the tubular coupling.

11. Apparatus as in claim 3 wherein the dielectric shell has a plurality of holes and the brush means comprises a plurality of brush holders mounted in the holes in the dielectric shell so that the brushes are in positions juxtaposed with the slip ring means.

12. Apparatus as in claim 3, further comprising:
at least one insulative tube around at least one of the plurality of bolts; and
fasteners for securing the brush means to the at least one insulative tube.

13. Apparatus for artificially illuminating, comprising:
a source of artificial light;
a housing, comprising:
(a) a cylindrical dielectric shell having at least one hole;
(b) a first end plate having a bore and a plurality of holes;
(c) a second end plate having a bore and a plurality of holes;
(d) a plurality of threaded bolts associated with the plurality of holes in the first and second end plates; and
(e) a plurality of nuts fastened onto the bolts;
means for mounting the housing to a ceiling;
an electrically powered gear motor, the motor having a drive shaft;
an arm extending outwardly from the housing;
coupling means, comprising:
(a) a gear train having a worm gear connected to the drive shaft and having a rotary gear meshed with the worm gear;
(b) a first bearing mounted in the bore of the first end plate;
(c) a second bearing mounted in the bore of the second end plate;
(d) a tubular coupling rotatably mounted in the first and second bearings;
(e) a mild steel plug press-fitted into the tubular coupling, the plug having a bore;
(f) a threaded bolt disposed in the bore of the plug, the rotary gear being situated on the bolt;
(g) a Bellville washer disposed on an opposite side of the rotary gear from the plug; and
(h) a jam nut rotated onto the bolt into contact with the Bellville washer;
means for suspending the source of artificial light from the arm;
slip ring means press-fitted circumferentially onto the tubular coupling;
brush means, comprising:
(a) brush holders mounted in holes in the dielectric shell; and
(b) brushes in positions juxtaposed with the slip ring means;
first electrical conductor means for conducting electrical power to the brushes; and
second electrical conductor means for conducting electrical power from the slip ring means to the source of artificial light;
whereby the uniformity of illumination over the area on which the artificial light is impinged is increased.

14. Apparatus as in claim 13 wherein the means for suspending the source of artificial light from the arm comprises:
a first hook attached to the source of artificial light;
a second hook attached to the arm; and
a chain for interconnecting the first and second hooks.

* * * * *